Dec. 3, 1957     C. J. RYANT, JR., ET AL     2,814,952
GAS SAMPLING AND TEMPERATURE MEASURING DEVICE
Filed Nov. 30, 1955
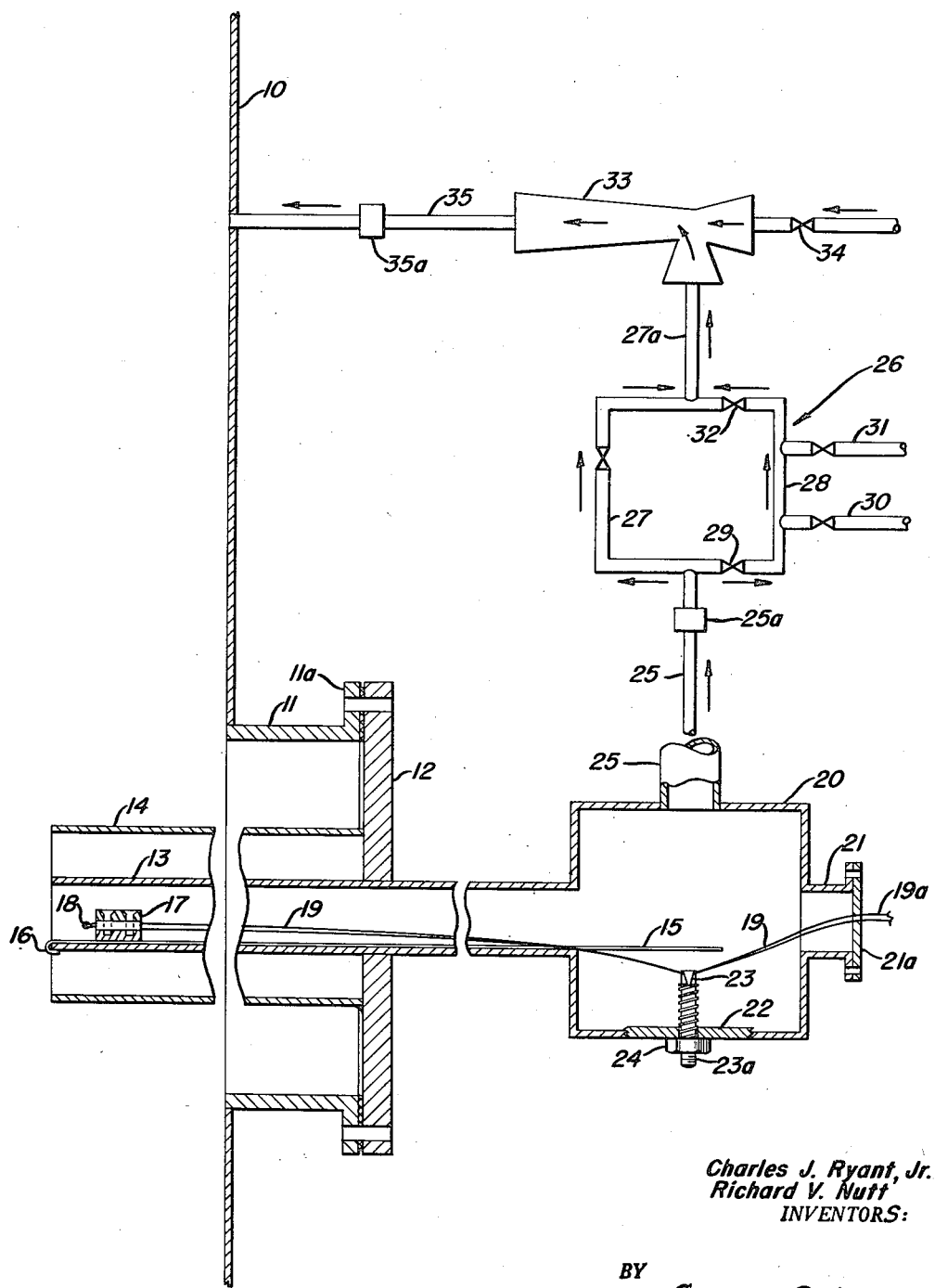
Charles J. Ryant, Jr.
Richard V. Nutt
INVENTORS:
BY
*Everett A. Johnson*
ATTORNEY United States Patent Office 2,814,952
Patented Dec. 3, 1957

2,814,952
GAS SAMPLING AND TEMPERATURE MEASURING DEVICE

Charles J. Ryant, Jr., and Richard V. Nutt, Chicago, Ill., assignors to Standard Oil Company, Chicago, Ill., a corporation of Indiana Application November 30, 1955, Serial No. 550,049

5 Claims. (Cl. 73—349)

This invention relates to a system for inspecting flowing fluids. More particularly, the invention relates to means for analyzing and determining the temperature of a flowing gas at an inspection point.

Devices of this type to which the invention is directed are useful, for example, in determining furnace gas temperature and composition. In such tests, it is necessary to know the temperature of the flue gas as well as the excess air content at the same location. Such concurrent determinations are desirable because the temperature and composition of flue gases in various parts of a furnace are not always the same or uniform. Thus, measurement of temperature at one point and analyzing a sample taken of the gas at another point will generally give inaccurate results.

Static thermocouples do not indicate the true temperature of a gas stream if the heat transferred to the thermocouple by conduction-convection does not equal the radiation heat loss by the thermocouple. Accordingly, static thermocouples are not suitable for measuring flue gas temperatures in furnaces, ducts, stacks, and related equipment.

It is, therefore, a primary object of our invention to provide a system for sampling a gas to be analyzed and for determining the temperature of the gas sample at the sampling point. A more specific object of the invention is to provide a thermocouple installation wherein the thermocouple is exposed to flowing gases so that the heat transferred to the thermocouple by conduction-convection equals the radiation heat loss by the thermocouple. A further object of the invention is to provide a system for obtaining a sample of the gas corresponding to the composition existing at the point where temperature is measured. Still another object of the invention is to provide means for installing the thermocouple, so that it is quickly removable, uniformly positioned, and simply installed. These and other objects of the invention will become apparent as the description thereof proceeds.

Briefly, we attain the objects of our invention by providing a gas diversion tube within which a velocity thermocouple means is mounted on a retractable clamp; a heat radiation shield means is fixed about diversion tube. Gas is withdrawn through the diversion tube at a constant rate and may be returned to the gas duct down stream of the thermocouple and an increment removed from the system for analysis.

Further details of construction and advantages of our invention will be described with reference to a preferred embodiment of our invention which is illustrated in the accompanying drawing and wherein an installation is schematically illustrated as applied to a flue gas stack.

Referring to the drawings, the apparatus is applied to a wall 10 of a conduit through which gas is flowing. An opening 11 in the conduit wall 10 is provided with a flanged member 11a. A plate 12 is disposed across the flanged member 11a and supports the sample tube 13 within the bore 12a in the plate 12. A shield tube 14 is substantially coextensive with the portion of the sample tube 13 which extends within the vessel through the wall 10 and is secured at one end to the inner face of the plate 12.

A thermocouple clamp bar 15 provided with hook 16 extends within the sample tube 13 with the hook 16 in engagement with the inlet end of the tube 13. A clamping block 17 is carried by the bar 15 and secures the thermocouple means adjacent the inlet end of the tube 13. The thermocouple means includes the hot junction 18 and the conductors 19 which are connected by the outside thermocouple leads 19a to conventionally measuring and recording instruments (not shown).

At the outlet end of the sample tube 13 we provide a junction box 20 having flanged member 21 and closure plate 21a therefor, through which the thermocouple conductors 19 are passed. The clamp bar 15 extends outwardly from the sample tube 13 into the junction box 20 and a threaded plug 22 in a wall of the box 20 provides access to the box for the manipulation of the bar 15 and the hook 16 with respect to the inlet end of the sample tube 13.

The threaded plug 22 also supports the hook 23 which is adapted to maintain the thermocouple conductors 19 taut, and a lock nut 24 maintains the adjusted position of the hook 23 as determined by its threaded shank 23a in the plug 22.

Gas outlet conduit 25 is provided with a restrictive constant flow orifice 25a and discharges into the sampler system designated generally by the reference numeral 26. The sampler 26 includes valved sampling line 28 having branched sample taps 30 and 31 which may be connected to conventional gas analyzer equipment not shown in the drawings.

The excess sample gas from the sampler 26 is conducted by line 27a into eductor 33. Air, steam, process gas, or other motive fluid is supplied to the eductor 33 by valved line 34 and the excess gas, together with the motive fluid, passes through line 35 and restrictive orifice 35a through the wall 10 where the total fluids commingle with the fluids in the duct 10.

In operation, the temperature is sensed by the thermocouple junction 18 which is exposed to the flowing gas sample. The indicated temperature is the true temperature of the gas stream since the heat transferred to the thermocouple 18 by conduction-convection is equal to the radiation heat loss by the thermocouple 18 which is controlled by the shield 14. Such radiation which normally occurs can be further reduced by providing additional concentric and spaced shield tubes 14. By keeping the thermocouple conductors 19 taut by tension hook 23, the hook 16 and the end of the bar 15 are held in rigid engagement. However, by means of the removable plate 21a and the removable plug 22 we may remove and replace the thermocouple assembly without otherwise upsetting the installation.

From the above, it will be apparent that we have attained the objects of our invention and have provided a system which is uniquely adapted for determining the temperature of a flowing gas and concurrently sampling such gas. It should be understood, however, that the temperature measurement function can be performed without any analysis being made on the gases and in this event the sample taps 30 and 31 remain closed and the gases flow at a uniform and constant rate through the sampling tube 13. If the gases are noxious or dangerous it is desirable to return the diverted sample of gas flow to the duct 10. However, if desired, the controlled flow of gas through the sampler tube 13 can be vented to the atmosphere or otherwise as desired.

We have described our invention with reference to a particular embodiment thereof but it should be understood that this is by way of illustration only and that the scope of the invention is not necessarily limited thereby. However, from the above description and the accompanying drawings it will be apparent to those skilled in the art that we have provided an integrated system for determining the true temperature of a flowing gas and for enabling the analysis of such gas. Further, it is intended that modifications can be made in the construction and mode of operation of the system described without departing from the spirit of our invention.

What we claim is:

1. The apparatus comprising an elongated probe adapted to be inserted through an opening in a duct comprising in combination a tubular sampling conduit, a support plate about a portion of said conduit, means for fixing said plate across said opening, a tubular shield concentric with and spaced from said conduit, said shield being co-extensive with the inner end of said conduit and being fixed to the inner face of said plate, a junction box carried by the outer exposed end of said conduit, a thermocouple clamp bar removably extending within said conduit and into said junction box, a hook on the inner end of said clamp bar for attachment to the inner end of said sampling conduit, a thermocouple clamping block carried by said clamp bar adjacent the inlet end of said conduit, a thermocouple junction supported by its thermocouple conductors secured within said block, a removable plug in a wall of said junction box affording access to said clamp bar for manipulation thereof, an adjustable hook means extending within said box for keeping said conductors taut thereby causing the hook on said bar to engage the end of said conduit and hold the thermocouple rigid, a gas sampler, conduit means between said sampler and said junction box, and eductor means connected between said sampler and said duct for inducing flow through said sampling conduit, said junction box, and said sampler and for returning the excess gas to said duct.

2. A gas sampling and temperature measuring probe comprising an elongated conduit, support means for said conduit, heat radiation shield means about said conduit, and removable thermocouple means within said conduit, said thermocouple means including a clamp bar, a hook on the end of said clamp bar for engaging the inlet end of said conduit, a thermocouple clamp support carried by said bar, and means on the outlet end of said conduit affording access to said bar to permit manipulating and securing said bar, said bar being adapted to be positioned substantially parallel to the axis of the said conduit and having a sufficient length relative to the conduit to place the end remote from the hook adjacent the access means whereby said bar may be manipulated for insertion and removal.

3. In a thermocouple assembly the improvement which comprises a flow conduit means for substantially enclosing said thermocouple means, access means on the outlet end of said conduit means, shield means arranged about said conduit means, removable support means for said thermocouple means including a detachable clamp bar extendable within said conduit means, hook means at the inner end of said bar adapted to engage the inlet end of said conduit means, said bar being adapted to be positioned substantially parallel to the axis of the said conduit and having a sufficient length relative to the conduit to place the end remote from the hook adjacent the access means whereby said bar may be manipulated for insertion and removal, and adjustable means for securing said clamp bar within said conduit.

4. An apparatus comprising a flow conduit, access means on the outlet end of said conduit, a thermocouple disposed within said conduit, a removable clamp bar within said conduit for supporting said thermocouple therein, said thermocouple being attached to said clamp bar, a hook on the inner end of said clamp bar adapted to engage the inner end of said conduit, a shield member surrounding said conduit for a portion of its length adjacent the inlet thereof, said shield member providing a static fluid envelope about said conduit, and said bar being adapted to be positioned substantially parallel to the axis of the said conduit and having a sufficient length relative to the conduit to place the end remote from the hook adjacent the access means whereby said bar may be manipulated for insertion and removal.

5. An apparatus useful in simultaneously sampling a flowing gas stream and for determining the temperature thereof which includes a sample tube, a tubular element spaced from and secured about the inlet of said sample tube, access means on the outlet end of said tube, thermocouple means disposed within said sample tube in the portion of its length which is within said shield, a removable clamp bar supporting said thermocouple means within said sample tube, said thermocouple means being attached to said clamp bar, a hook on the inner end of said clamp bar adapted to engage the inner end of said sample tube, said bar being adapted to be positioned substantially parallel to the axis of the said conduit and having a sufficient length relative to the conduit to place the end remote from the hook adjacent the access means whereby said bar may be manipulated for insertion and removal, and means for flowing a sample at a uniform rate through said sample tube.

References Cited in the file of this patent

UNITED STATES PATENTS

| 576,537 | Barry | Feb. 9, 1897 |
| --- | --- | --- |
| 2,480,557 | Cummins | Aug. 30, 1949 |
| 2,718,538 | Wyatt | Sept. 20, 1955 |

FOREIGN PATENTS

| 274,096 | Great Britain | Nov. 10, 1927 |
| --- | --- | --- |
| 573,361 | Great Britain | Nov. 16, 1945 |